(12) United States Patent
Frank et al.

(10) Patent No.: US 8,119,004 B2
(45) Date of Patent: Feb. 21, 2012

(54) LIQUID-LIQUID EXTRACTION

(75) Inventors: Timothy C. Frank, Midland, MI (US); John J. Anderson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 458 days.

(21) Appl. No.: 12/375,275

(22) PCT Filed: Jul. 26, 2007

(86) PCT No.: PCT/US2007/016805
§ 371 (c)(1),
(2), (4) Date: Jan. 27, 2009

(87) PCT Pub. No.: WO2008/020971
PCT Pub. Date: Feb. 21, 2008

(65) Prior Publication Data
US 2009/0321352 A1    Dec. 31, 2009

Related U.S. Application Data

(60) Provisional application No. 60/838,335, filed on Aug. 17, 2006.

(51) Int. Cl.
*B01D 11/00*   (2006.01)

(52) U.S. Cl. .............. 210/634; 95/156; 95/185; 95/260; 210/511; 422/256; 568/451

(58) Field of Classification Search ............... 196/14.52; 95/149, 150, 156, 157, 185, 241, 242, 260; 96/155; 210/511, 634, 639; 422/256–260; 423/220, 246; 568/451, 454
See application file for complete search history.

(56) References Cited

U.S. PATENT DOCUMENTS

| | | | | |
|---|---|---|---|---|
| 2,667,407 A * | 1/1954 | Fenske et al. | ............... | 423/658.5 |
| 2,726,145 A * | 12/1955 | Holmes et al. | ............... | 422/259 |
| 2,735,755 A * | 2/1956 | Carney | ............... | 208/311 |
| 2,746,846 A * | 5/1956 | Grunewald et al. | ............. | 423/24 |
| 2,775,543 A * | 12/1956 | Long et al. | ............... | 196/14.52 |
| 3,318,668 A * | 5/1967 | Ziehl | ............... | 422/259 |
| 3,415,615 A * | 12/1968 | Blytas et al. | ............... | 423/246 |
| 3,689,371 A * | 9/1972 | Kerber et al. | ............... | 203/37 |
| 4,200,525 A * | 4/1980 | Karr | ............... | 210/634 |
| 5,180,854 A | 1/1993 | Abatjoglou et al. | | |
| 5,410,090 A * | 4/1995 | Beadle et al. | ............... | 568/451 |
| 5,932,101 A * | 8/1999 | Kanel et al. | ............... | 210/634 |
| 7,262,330 B2 * | 8/2007 | Ueda et al. | ............... | 568/454 |

FOREIGN PATENT DOCUMENTS

| | | |
|---|---|---|
| EP | 0419364 | 3/1991 |
| GB | 876070 | 8/1961 |
| WO | WO-2007/133379 | 11/2007 |

OTHER PUBLICATIONS

Karr, AIChE J 5(4) pp. 446-452 (1959).
Karr and Lo, Chem. Eng. Prog. 72(11),pp. 68-70 (1976).
Karr AIChE J 31(4) pp. 690-692 (1985).
Pratt and Stevens, Chapter 8, pp. 492-589 in *Science and Practice of Liquid-Liquid Extraction*, vol. 1, Thornton, ed. (1992).
Kumar and Hartland, Ind. Eng. Chem. Res. 38(3), pp. 1040-1056 (1999).
Seibert, "Extraction and Leaching", Chapter 14 pp. 483-521 in *Chemical Process Equipment: Selectrion and Design*, 2nd ed. (2005).
*Solvent Extraction Principles and Practice*, 2nd ed., Chapter 10, pp. 415-453 (2004).
Robbins and Lo, "Liquid-Liquid Extraction," Sections 1.9 and 1.10 in *Handbook of Separation Techniques for Chemical Engineers*, 3rd Ed., (1997).
Robbins and Cusack Section 15, "Liquid-Liquid Extraction Operations and Equipment," in *Perry's Chemical Engineers' Handbook*, 7th ed. pp. 15-44 (1997).
Lo and Prochazka, "Reciprocating-Plate Extraction Columns," Chapter 12 in *Handbook of Solvent Extraction* (1983).
Baird, Rao, Prochazka, and Sovova, "Reciprocating-Plate Columns," Chapter 11 in *Liquid-Liquid Extraction Equipment*, pp. 307-362, (1994).
Leblanc, Secco, and Kostic, "Viscosity Measurement", Chapter 30 in *Measurement, Instrumentation, and Sensors Handbook*, Webster, ed. (CRC Press, 1999).

* cited by examiner

*Primary Examiner* — Joseph Drodge

(57) ABSTRACT

A liquid-liquid extraction process that uses counterflowing liquid phases, especially in conjunction with a reciprocating plate extraction column, wherein one of the liquid phases has a lower density than the other and is at least partially saturated with a dispersible gas, requires less plate stack height or a smaller column diameter when plate-to-plate spacing is non-uniform rather than uniform and such non-uniform plate-to-plate spacing includes greater plate-to-plate spacing proximate to raffinate liquid discharge than proximate to feed of the lower density liquid phase.

8 Claims, No Drawings

LIQUID-LIQUID EXTRACTION

This application claims the benefit of U.S. Provisional Application No. 60/838,335 filed Aug. 17, 2006.

The present invention relates generally to liquid-liquid extraction, sometimes referred to simply as "liquid extraction" or "solvent extraction". These interchangeable terms refer to distribution of a solute, either a removable compound desired for its value as a product or a removable liquid contaminant, following contact between two immiscible fluids or between two partially-miscible fluids such that their intimate contact does not yield a single liquid phase. The present invention relates more particularly to liquid extraction where one of the immiscible or partially-miscible fluids, nominally a "first liquid" or alternatively as a "feed liquid", is an at least partially gas-saturated fluid and has a lower density than the other fluid, nominally a "second liquid" or alternatively as an "extraction liquid". The first liquid substantially maintains its gas-saturation level up to and, preferably, through and for at least a short time after, initial contact with the second liquid. The first liquid also contains the solute. The present invention also relates to an apparatus suitable for use in liquid extraction where one of two immiscible or partially-miscible fluids is an at least partially gas-saturated fluid upon its introduction into the apparatus and has both a defined solute concentration and a lower density than the other fluid.

The first and second liquids differ enough from one another that at least a portion of the solute passes from the first liquid to the second liquid when the two liquids come into contact with one another. The portion will vary in size depending upon factors that include contact time, surface area of one liquid in contact with the other liquid and "partition ratio", an expression of thermodynamic potential for transfer of a solute between two liquids in contact with each other.

"Partition ratio" commonly refers to a ratio of weight percent (wt %) solute in the extraction liquid as a numerator and wt % solute in the feed liquid as a denominator, said concentrations resulting from contact of the two fluids and subsequent attainment of thermodynamic equilibrium. A product of the partition ratio times a ratio of extraction liquid mass flow rate to feed liquid mass flow rate within a treatment zone of an extraction column is commonly called the extraction factor (E). Skilled artisans recognize that the extraction factor must be greater than unity for liquid-liquid extraction to have sufficient potential to transfer a high percentage of solute from the feed liquid to the extraction liquid. Furthermore, extraction factor values less than unity indicate that the fraction of solute that can transfer from the feed fluid to the wash fluid is limited by the amount of wash fluid, and the maximum fraction that can transfer is approximately equal to the numerical value of the extraction factor.

In an extraction column with counterflowing liquid phases, skilled artisans typically specify the extraction process such that E falls within a range of from 1.3 to 10. As E increases within the range of from 1.3 to 10 the amount of wash fluid used in the extraction process increases, and it is typically observed that the property skilled artisans refer to as a number of theoretical stages or transfer units decreases for a given transfer.

In addition to a desired extraction factor, design of an extraction column must take into account and overcome a phenomenon known as mass-transfer resistance or "MTR". Skilled artisans commonly express MTR in terms of height of a theoretical stage or height of a transfer unit. Such height values factor into determining a required extraction column height to effect a desired separation. For a mechanically-agitated extraction column, factors that affect height of a theoretical stage and height of a transfer unit include agitation mechanism, agitation intensity, location of the agitation mechanism within the column, and volumetric throughput of liquids through the column.

U.S. Pat. No. 4,200,525 (Karr) discloses a process for liquid extraction using counter-flowing liquid phases in a reciprocating plate extraction column. Karr teaches that spacing between plates, preferably perforated plates, in at least a portion of a column of a plurality of plates, stems from application of a formula: $1\alpha((U_D+0.67U_C)^{2.5}/((\Delta\rho)^{5/3}\sigma^{3/2}))$, which for a given set of flow conditions can be simplified to $1\alpha(1/((\Delta\rho)^{5/3}\sigma^{3/2}))$. This simplified form of the formula is taught by Pratt and Stevens, "Selection, Design, Pilot-Testing, and Scale-up of Extraction Equipment," Chapter 8 in *Science and Practice of Liquid-Liquid Extraction* (Oxford University Press, 1992), p. 560. In the formula, "1" is the relative plate spacing in different portions of the extraction column, "$U_D$" is the superficial velocity of the dispersed phase at flooding, "$U_C$" is the superficial velocity of the continuous phase at flooding, "$\Delta\rho$" is the density difference between the liquid phases, and "$\sigma$" is the interfacial tension between the counter-flowing phases. As long as one uses a consistent system of units of measurement for the values used in the formula (e.g. dynes per centimeter for interfacial tension, grams per mL for density difference, and foot per second for superficial liquid velocity) for a given calculation of relative plate spacing, one may use any system of units of measurement.

Karr '525 provides examples for liquid-liquid extraction of phenol from water using isobutyl acetate as a solvent in a reciprocating-plate column having a top and a bottom. The phenol-containing water constitutes a "feed liquid" and has a density greater, than isobutyl acetate, nominally the "wash liquid". In the examples, Karr '525 teaches addition of the feed liquid at the top of the column and the wash liquid at the bottom of the column. In Example 3, which applies the formula noted above, Karr '525 teaches that plate spacing is greatest near introduction of the feed liquid (greatest density liquid, as between the feed liquid and the wash liquid) and least near introduction of the wash liquid (lowest density liquid, as between the feed liquid and the wash liquid), with an 8 to 1 spacing ratio (top plate or feed end spacing to bottom plate or wash liquid end spacing). In Example 3, Karr '525 also teaches that both density difference and interfacial tension are lower at the top or feed end than at the bottom or wash liquid end. None of the liquids disclosed in Karr '525 demonstrates a gas saturation level.

An attempt to wash an organic liquid that contains a dissolved or dispersed gas with water typically leads to flooding or foaming which limits productivity of a liquid-liquid extractor such as a reciprocating-plate column. A first conventional solution to minimize or eliminate flooding and foaming leads to operating the reciprocating-plate column far below its maximum volumetric flow rate capacity or throughput. A second conventional solution adds a precursor step of subjecting such an organic liquid to a degassing step before initiating liquid-liquid extraction. A third conventional solution effects liquid-liquid separation under sufficient applied pressure to keep the dissolved or dispersed gas in solution substantially through and preferably completely through, liquid-liquid separation.

The present invention avoids the aforementioned conventional solutions. At the same time, the present invention favors efforts to maximize productivity in terms of efficient mass transfer of a removable product solute or a removable contaminant such as NMP from an organic solvent to a wash liquid such as water at much higher volumetric throughput rates than those used in the first conventional solution noted above.

A first aspect of the present invention is a method of effecting liquid-liquid separation using at least two counter-flowing liquids each of which flows through a vertically aligned treatment zone, the treatment zone having a longitudinal axis and a bottom end that is spaced apart from and disposed below a top end, which method comprises:

a. establishing a flow of a feed fluid composition in a first direction through the treatment zone, the first direction being from the bottom end to the top end, the feed fluid composition (1) comprising a first liquid and a removable solute, (2) being at least partially saturated with a dispersible gas, and (3) having a first density, the feed fluid composition being present under a pressure sufficient to maintain at least a portion of the dispersible gas in solution as the feed fluid composition enters the treatment zone, yet insufficient to maintain the dispersible gas in solution as the feed fluid composition traverses the treatment zone from the bottom end to the top end, and having a first mass flow rate; and b. establishing a flow of a wash fluid composition in a second direction through the treatment zone, the second direction being from the top end to the bottom end, the wash fluid composition comprising a second liquid, the second liquid (1) being either immiscible or, at most, partially miscible with the first liquid such that their intimate contact does not yield a single liquid phase, and (2) having a density that is greater than the first density;

c. effecting operative contact between the flows of feed fluid composition and wash fluid composition while imparting sufficient mechanical energy to the flows to effect distribution of one fluid composition as a dispersed phase suspended within a continuous fluid comprising the other fluid composition (either the feed fluid composition as a dispersed phase suspended within a continuous phase comprising the wash fluid composition or the wash fluid composition as a dispersed phase suspended within a continuous phase comprising the feed fluid composition), the operative contact being sufficient to effect transfer of at least a portion of the removable solute from the feed fluid composition to the wash fluid composition, thereby converting the feed fluid composition to a raffinate liquid and the wash fluid composition to an extract liquid;

d. removing the raffinate liquid from the top end of the treatment zone and the extract liquid from the bottom end of the treatment zone.

In a preferred variation of the first aspect, the second liquid also has a second mass flow rate that, in conjunction with the first mass flow rate, yields an extraction factor greater than unity, preferably at least 1.3, and more preferably within a range of from 1.3 to 10.

A second aspect of the present invention relates to a method of using a reciprocating-plate extraction column to effect liquid-liquid separation between counter-flowing fluid compositions, the fluid compositions being a feed fluid composition and a wash fluid composition, the feed fluid composition containing a removable solute, having a lower density than the wash fluid composition, and being at least partially saturated with a dispersible gas, the column having disposed therein a treatment zone, the treatment zone having a bottom end and a top end, the bottom end being spaced apart from, disposed below and in fluid communication with the top end, the treatment zone having a longitudinal axis passing through both the top end and the bottom end and, the treatment zone also having disposed therein a plurality of perforated plates mounted on a shaft that is coaxially aligned with the treatment zone longitudinal axis and operatively connected to a reciprocating drive mechanism located external to the treatment zone, each of the plates having a major surface that is substantially perpendicular to the longitudinal axis, the bottom of the treatment zone being in fluid communication with a source of the feed fluid composition and with an extract liquid collection means and the top of the treatment zone being in fluid communication with a source of the wash fluid composition and with a raffinate liquid collection means, the method comprising:

a. directing a flow of feed fluid composition from the source of feed fluid composition through the treatment zone so it passes from the bottom end to the top end and a countercurrent flow of wash fluid composition from the source of wash fluid composition through the treatment zone so it passes from the top end to the bottom end;

b. effecting operative contact between the flows of feed fluid composition and wash fluid composition while imparting sufficient mechanical energy to the flows to effect distribution of one fluid composition as a dispersed phase suspended within a continuous fluid comprising the other fluid composition (either the feed fluid composition as a dispersed phase suspended within a continuous phase comprising the wash fluid composition or the wash fluid composition as a dispersed phase suspended within a continuous phase comprising the feed fluid composition), the operative contact being sufficient to effect transfer of at least a portion of the removable solute from the feed fluid composition to the wash fluid composition, thereby converting the feed fluid composition to a raffinate liquid and the wash fluid composition to an extract liquid; and c. conveying the raffinate liquid to the raffinate collection means and the extract liquid to the extract liquid collection means.

The present invention effectively optimizes application of mechanical agitation within an extraction column which, in turn, reduces required extraction column height or extraction column diameter to effect a desired separation and feed rate.

In both the first and second aspects of the present invention, the removable solute may comprise either a liquid contaminant or a liquid product. Whether it is a contaminant or a product depends upon factors such as utility of the solute once it is removed.

As used throughout this specification, definitions presented in succeeding paragraphs or elsewhere in the specification, have meanings ascribed to them where first defined.

When ranges are stated herein, e.g. from 2 to 10, both ends of the range (2 and 10) are included within the range unless otherwise specifically excluded.

"Raffinate liquid" means spent feed fluid composition. In other words, raffinate liquid refers to a feed fluid composition subsequent to liquid-liquid extraction processing. "Spent" simply means that the raffinate liquid has a lower level of removable solute than the feed fluid composition.

"Extract liquid" means augmented wash fluid composition. In other words, extract liquid refers to a wash fluid composition subsequent to liquid-liquid extraction processing. "Augmented" simply means that the extract liquid has a higher level of removable solute than the wash fluid composition.

The present invention promotes efficient handling of a fluid that is gas-laden, or at least partially saturated with a dispersible gas, in a liquid-liquid separation process involving a wash liquid or fluid having a greater density than the gas-laden fluid. It does so without requiring a separate degassing step in advance of the separation process. In addition, the present invention alleviates any need for effecting liquid-liquid separation under elevated pressure with any degassing step coming after completion or at least substantial completion of liquid separation. In accord with all aspects of the present invention, at least a portion of the dispersible gas comes out of solution as the feed fluid composition traverses the treatment zone, moving from the bottom end to top end.

The present invention has particular utility in extracting a solvent such as N-methylpyrrolidinone (NMP) from a feed fluid composition such as a hydroformylation reaction mixture that comprises NMP, an aldehyde reaction product, and dissolved carbon monoxide (CO) and hydrogen ($H_2$) gases using water as a wash solvent or wash fluid composition.

"Flooding", as used herein, refers to an undesirable event in liquid-liquid separation. It involves one or more of three phenomena in liquid-liquid separation of two counter-flowing fluids. One phenomenon manifests itself by way of entrainment of a portion of one fluid phase into an exit stream of the other fluid. A second phenomenon constitutes phase inversion such that droplets of a dispersed phase coalesce to form a new continuous phase that forms a barrier to countercurrent flow. A third phenomenon involves formation of a stable dispersion or emulsion of one fluid as a dispersed phase in the other fluid such that the dispersed phase does not coalesce just prior to exit from a liquid-liquid separation apparatus.

The formula expressed in U.S. Pat. No. 4,200,525 often leads to a plate spacing that is greater at that end of a treatment zone disposed in a liquid-liquid separation apparatus such as a reciprocating-plate column where a feed fluid composition enters the treatment zone and extract liquid exits the treatment zone than at that end of the treatment zone where a wash fluid composition enters the treatment zone and raffinate liquid leaves the treatment zone. Such plate spacing stems, in part, from an observation that interfacial tension between the counterflowing fluids tends to be much lower at that end of a treatment zone where the feed fluid composition enters the treatment zone than at that end of the treatment zone where the raffinate liquid leaves the treatment zone. That observation may be due, at least in part, to a concurrent finding that removable solute concentration is greatest at the end of the treatment zone where the feed fluid composition enters the treatment zone. Taking this into consideration, application of the above formula typically yields a plate spacing that is greatest at that end of a treatment zone where interfacial tension is lowest.

With reference to a reciprocating plate column as used in accord with the present invention, spacing between adjacent plates in a plate stack or plurality of plates preferably ranges from one inch (2.5 centimeters (cm)) to 12 inches (30.5 cm), more preferably from one inch (2.5 cm) to eight inches (20.3 cm). Still more preferably, the plate spacing varies such that it is greatest at the raffinate liquid end of a treatment zone and least at the extract liquid end of a treatment zone. A particularly preferred plate spacing that divides a treatment zone longitudinally into fifths proceeding from the raffinate liquid end of a treatment zone (otherwise known as that end of a treatment zone from which the raffinate liquid discharges and the wash fluid enters) to the extract liquid end of a treatment zone (otherwise known as that end of a treatment zone from which the extract liquid discharges and the feed fluid enters) is: first fifth a spacing within a range of from four inches (10.2 cm) to eight inches (20.3 cm); second fifth a spacing within a range of from two inches (5.1 cm) to three inches (7.6 cm); and a one inch (2.5 cm) spacing for the remaining three fifths.

The spaced-apart plates, when reciprocated at a sufficient agitation intensity, effectively impart enough mechanical energy to counter-flowing flows of feed fluid composition and wash fluid composition to effect distribution of one fluid composition as a dispersed phase suspended within a continuous phase comprising the other fluid composition. The agitation intensity will vary depending upon properties of the fluid compositions including interfacial surface tension and density.

While a reciprocating-plate column may be preferred, skilled artisans recognize that one may obtain similar results through use of a plurality of rotating impellers that are disposed within the treatment zone and coaxially aligned with the longitudinal axis. With a uniform rotating impeller size and shape, spacing between rotating impellers, all of which rotate at the same speed, tracks with that of the reciprocating plates. In other words, spacing between rotating impellers is greater proximate to the top of the treatment zone than it is proximate to the bottom of the treatment zone. Alternately, one may also vary at least one of impeller shape, impeller diameter or spacing of an impeller relative to, or in proximity to, an internal baffle mounted within the treatment zone or an internal disc mounted within the treatment zone to alter the intensity of mechanical energy along the treatment zone, from a lower value at the top of the treatment zone to a higher value at the bottom of the treatment zone.

Irrespective of which apparatus or device imparts mechanical energy, the present invention requires that one impart less mechanical energy at the top end of the treatment zone than at the bottom end of the treatment zone. In other words, one imparts mechanical energy with a greater intensity at the bottom end of the treatment zone than at the top end of the treatment zone. Preferably intensity of the mechanical energy throughout the treatment zone is sufficient to minimize flooding within any portion of the treatment zone, yet insufficient to sustain foaming proximate to the top end of the treatment zone.

The following examples illustrate, but do not limit, the present invention. All parts and percentages are based upon weight, unless otherwise stated. All temperatures are in ° C. Examples (Ex) of the present invention are designated by Arabic numerals and Comparative Examples (Comp Ex) are designated by capital alphabetic letters. Unless otherwise stated herein, "room temperature" and "ambient temperature" are nominally 25° C.

EXPERIMENTAL APPARATUS

Use a Karr reciprocating plate pilot scale unit available from Koch Modular Process Systems (KPMS) in the Ex and Comp Ex detailed below. The pilot scale unit consists of three hollow glass tubular sections that have an inner diameter of two inches (5.1 cm) and two hollow glass decanting sections having a connecting end inner diameter of two inches (5.1 cm), but a predominant inner diameter of four inches (10.2 cm) and a length of ten inches (25.4 cm) arranged such that one decanting section is disposed at either end of a long tubular segment that comprises the three hollow glass tubular sections and has a total length of 10 feet (3 meters). Join each of the glass sections to its adjoining glass section(s) with polytetrafluoroethylene (PTFE) spacers having an inner diameter of two inches (5.1 cm).

Each PTFE spacer provides two ports or access points. In practice, one port of each spacer accommodates a Type J thermocouple for temperature measurement, leaving one port of each spacer available for use as feed port.

Align the pilot scale unit vertically so that one decanting section serves as a bottom section and the other decanting section serves as a top section. Connect a source of water as a wash fluid composition to the feed port between the top decanting section and its adjacent hollow glass tubular section and a source of feed fluid composition to the feed port between the bottom decanting section and its adjacent hollow glass tubular section. The long tubular segment has an internal volume of approximately 6.5 liters. The pilot plant scale unit (long tubular segment plus the two decanting sections) has a total internal volume of approximately 10 liters.

Three pumps (Fluid Metering, Inc. (FMI)) having a maximum pumping capability of 1250 milliliters per minute (ml/min) enable fluid transfer to and from the pilot plant scale unit. One FMI pump transfers wash fluid composition from its source, in this case a 55 gallon (0.21 cubic meter ($m^3$)) drum. A second FMI pump transfers feed fluid composition from its source, in this case a second 55 gallon (0.21 $m^3$) drum. A third FMI pump meters aqueous fluid or raffinate liquid from the bottom section to a third 55 gallon (0.21 $m^3$) drum. Washed feed fluid or extract liquid flows from an overfill port above the top decanting section to a fourth 55 gallon (0.21 $m^3$) drum. A vent tube runs from the top decanting section to an empty five gallon (0.02 $m^3$) bucket. Stainless steel or PTFE tubing functions as transfer lines that connect the pilot scale unit to each of the drums or the bucket.

The transfer line for the feed fluid composition passes through a shell and tube heat exchanger in order to bring the feed fluid composition to a desired temperature before it enters the pilot scale unit. Likewise, the wash fluid composition passes through a shell and tube heat exchanger in order to bring the wash fluid composition to a desired temperature before it enters the pilot scale unit.

A plurality of PTFE plates that contain circular holes or apertures with plate to plate spacing established by PTFE spacers forms a reciprocating plate agitation assembly or stack. A motor mounted above the pilot scale unit and connected to the reciprocating plate agitation assembly moves the assembly up and down within the long tubular segment through a ¾ inch (1.9 cm) stroke at a controlled stroke per minute (SPM) rate.

The feed fluid composition is a reaction product mixture from a hydroformylation reaction conducted under an applied pressure of 400 pounds per square inch gauge (psig) (28.6 bar) (2.76 megapascals (MPa) of a 1:1 molar ratio mixture of CO and $H_2$ that, after washing with water at near atmospheric pressure to remove a substantial portion of catalyst contained in the product mixture before washing and reduce NMP content, contains 6.4 percent by weight (wt %) NMP, based upon total feed fluid composition weight, ten ppm homogeneous catalyst consisting of sulfonated aromatic phosphene ligand complexed with rhodium (Rh) metal (that is, 10 parts by weight of residual catalyst per million parts by weight of feed fluid composition), 75 to 80 wt % of formyl soy methyl esters (consisting mainly of C18 (18 carbon atom) mono-, di-, and tri-aldehydes in a respective approximate weight ratio of 7:10:1) plus approximately 3% methyl stearate, 7% methyl palmitate, 2% methyl oleate, 3% methyl linoleate, and 1% methyl linolenate, and sufficient dissolved or dispersed carbon monoxide (CO) gas and hydrogen ($H_2$) gas to cause discernible degassing during subsequent processing of the feed fluid composition at or near atmospheric pressure.

The feed fluid composition is stored in sealed drums for a period of from one (1) to three (3) days before processing using the pilot scale unit.

During operation of the pilot scale unit, the feed fluid composition constitutes a continuous phase and the wash fluid composition, which passes as drops through the feed fluid composition, serves as a dispersed phase. The drops coalesce in the bottom section at a liquid-liquid interface. If desired, one may, without departing from the present invention, reverse roles of the feed fluid composition and wash fluid composition such that the feed fluid composition becomes the disperse phase and the wash fluid functions as the continuous phase.

Analytical

Use gas chromatography (GC) analysis to determine NMP content of the extract liquid and the raffinate liquid to evaluate extraction performance. GC analysis uses a one gram sample of extract liquid or raffinate liquid, as appropriate, diluted with 15 ml of isopropanol that contains an internal standard of diethylene glycol.

Use GC analytical results to determine a NMP partition ratio (K) on a mass basis. Add to a small glass vial (nominally 50 mL in size) a volume of the above-identified NMP-containing feed fluid composition and an equal volume of water as a wash fluid composition until the vial is about three-quarters full of liquid, then use a rubber stopper or threaded cap to seal the vial and shake vigorously by hand for a period of 10 minutes in an effort to achieve equilibrium between the two compositions. Halt mixing and allow the mixed compositions to separate into two clarified liquids, an extract liquid and a raffinate liquid. Calculate an NMP partition ratio using the wt % NMP in the extract liquid as a numerator and wt % NMP in the raffinate liquid composition as a denominator. For the above feed fluid composition as processed by the pilot scale unit with an inlet feed fluid temperature of 70 degrees centigrade (° C.), K=14.8.

Table 1 below summarizes density or $\rho$ (in grams per cubic centimeter (g/cc) and viscosity or $\mu$ (in centipoises (cP) and Pascal second (Pa·s)) values for the feed fluid composition, wash fluid composition, raffinate liquid and extract liquid at a temperature of 70° C. Determine these values by sampling the feed fluid composition and wash fluid composition before passing them through the pilot scale unit and sampling the raffinate liquid and extract liquid after operation of the unit. Many standard methods exist for measuring density and viscosity. As long as a single method is used for all measures, all methods should yield consistent, comparative results. Publicized standard methods include those described in: *Measurement of Transport Properties of Fluids*, Vol. III, Wakeham, Nagashima, and Sengers, eds. (Blackwell, 1991); and Leblanc, Secco, and Kostic, "Viscosity Measurement", Chapter 30 in *Measurement, Instrumentation, and Sensors Handbook*, Webster, ed. (CRC Press, 1999). A preferred method, documented in American Society for Testing and Materials (ASTM) test D7042-04 (2005), implements Stabinger's methods for simultaneous measurement of viscosity and density. Table 1 below reports data measured in accord with ASTM D7042-04.

Estimate interfacial surface tension between organic phase (predominantly aldehyde from the feed fluid composition) and aqueous phase (predominantly water from the wash fluid composition) in the top section and in the bottom section by measuring surface tension of liquids having representative compositions using a method, commonly known as Du Noüy's ring method, described by Drelich, Fang, and White ["Measurement of Interfacial Tension in Fluid-Fluid Systems," in *Encyclopedia of Surface and Colloid Science* (Marcel Dekker, 2003), pp. 3152-3156]. This method derives interfacial tension values from a measurement of force required to detach a ring of wire from a liquid-liquid interface. The method requires one to use an extremely clean ring and to maintain the ring in a horizontal orientation at an interface between the organic phase and the aqueous phase. Calculate interfacial tension using a formula $\sigma=f\times F/(p \cos\theta)$, where $\sigma$ is interfacial tension (Newtons per meter (N/m) or dynes per centimeter (dynes/cm)), F is the measured force required to detach the ring (N or dyne), p is the perimeter of the ring (m or cm), θ equals contact angle measured for a liquid meniscus in contact with the ring, and f is a correction factor determined by calibration of the apparatus. Drelich, Fang, and White teach that typical values of f lie within a range of from 0.75 to 1.05.

In the top section, the representative feed composition is 78 wt % formyl soy methyl esters (consisting mainly of $C_{18}$ mono-, di-, and tri-aldehydes in the ratio of 7:10:1 by wt) plus 3 wt % methyl stearate, 7 wt % methyl palmitate, 2 wt % methyl oleate, 3 wt % methyl linoleate, and 1 wt % methyl linolenate, a catalyst residue consisting of approximately 10 ppm sulfonated aromatic phosphene and approximately 1 ppm Rh, and about 6 wt % NMP, each wt % being based upon total representative feed composition weight. The entering wash fluid is clean water. In the bottom section, the aqueous extract contains about 35 wt % NMP. The raffinate is comprised of essentially all of the organic content present in the feed less the NMP. Using Du Noüy's ring method as described above, the approximate interfacial tension values are 15.3 dynes per centimeter ($1.5 \times 10^{-4}$ N/m) at the top of the long tubular segment (proximate to the top section) and 9.9 dynes per centimeter ($9.9 \times 10^{-3}$ N/m) at the bottom of the long tubular segment (proximate to the bottom section). The fluid density difference is 0.10 g/cm$^3$ (100 kg/m$^3$) at the top of the long tubular segment and 0.07 g/cm3 (70 kg m$^3$) at the bottom of the long tubular segment.

Using the formula from U.S. Pat. No. 4,200,525 noted above and the density and interfacial tension data, a calculated relative plate spacing is 1.0 at the top of the long tubular segment and 3.5 at the bottom of the long tubular segment, with a plate spacing of 1.0 representing a normalized value.

Evaluate mass-transfer performance in terms of height of a transfer unit (HTU) according to a formula where: HTU=[Z(1−E)]/ln [Xin/Xout(1−1/E)+1/E]. In the formula, "ln" means natural log, "Z" represents total plate stack height, "Xin" and "Xout" are, respectively, NMP concentration in the feed fluid composition and NMP concentration in the raffinate liquid, and "E" is an extraction factor. Calculate a representative value for "E" according to a formula where E=K (S/F) in which "K" is the partition ratio determined as noted above, "S" is mass flow rate of the wash fluid composition, and "F" equals mass flow rate of the feed fluid composition. Skilled artisans recognize that a precise calculation for E at each position within a treatment zone may produce some variability due, at least in part, to variations in K, solute concentration and liquid flow rates. Skilled artisans also recognize that, as between two HTU values, a smaller HTU value indicates a better mass-transfer performance as it suggests that more transfer units result from a given height of extraction column.

TABLE 1

| Liquid Stream | ρ (g/cc) | μ (cP/Pa · s) |
|---|---|---|
| Wash Fluid | 0.9919 | 0.81/0.81 × 10$^{-3}$ |
| Feed Fluid | 0.8903 | 4.15/4.15 × 10$^{-3}$ |
| Extract Liquid | 0.9599 | 0.56/0.56 × 10$^{-3}$ |
| Raffinate Liquid | 0.8878 | 4.11/4.11 × 10$^{-3}$ |

Comp Ex A

Uniform Plate Spacing

Using a uniform plate-plate spacing of two inches (5.1 cm), operate the pilot scale unit according to conditions specified in Table 2 below. Pilot scale unit operating conditions include feed fluid composition (nominally aldehyde) feed rate in gallons per hour (gal/hr) (m$^3$/hr), wash fluid composition (nominally water) feed rate in gal/hr (m$^3$/hr), column throughput in gal/hr/square foot (gal/hr/ft$^2$) (m$^3$/h/m$^2$), wash solvent to feed (S/F) ratio (wt/wt basis), bottom temperature (proximate to the bottom of the long tubular segment) in ° C., top temperature (proximate to the top of the long tubular segment) in ° C. and agitation intensity (strokes per minute or SPM times stroke length (¾ inch or 1.9 cm).

Table 3 below contains a summary of mass-transfer performance in terms of wt % NMP in the feed fluid composition, wt % NMP in the raffinate liquid, Xin/Xout, E and HTU.

TABLE 2

| Run Number | Aldehyde Feed Rate (gal/hr)/(m$^3$/hr) | Water Feed Rate (gal/hr)/(m$^3$/hr) | Throughput (gph/ft$^2$)/(m$^3$/h/m$^2$) | S/F Ratio (wt/wt) | Bottom Temp (° C.) | Top Temp (° C.) | Agitation Intensity (SPM*-inch)/(SPM-cm |
|---|---|---|---|---|---|---|---|
| 1 | 8.2/0.031 | 1.4/0.005 | 440/17.9 | 0.196 | 70 | 65 | 105/267 |
| 2 | 14.6/0.055 | 2.4/0.009 | 778/31.7 | 0.181 | 72 | 68 | 83/211 |
| 3 | 19.5/0.074 | 2.9/0.011 | 1028/41.9 | 0.166 | 73 | 74 | 75/190 |
| 4 | 18.5/0.070 | 5.3/0.020 | 1091/44.5 | 0.319 | 76 | 72 | 60/152 |
| 5 | 14.2/0.054 | 4.0/0.015 | 836/34.1 | 0.313 | 76 | 75 | 68/173 |
| 6 | 19.5/0.074 | 3.5/0.013 | 1051/42.8 | 0.198 | 70 | 69 | 60/152 |
| 7 | 14.0/0.053 | 2.4/0.009 | 755/30.8 | 0.193 | 81 | 71 | 75/190 |
| 8 | 7.4/0.028 | 1.1/0.004 | 390/15.9 | 0.17 | 76 | 67 | 120/305 |

*SPM-inch denotes the number of complete up and down strokes per minute multiplied by the stroke length in inches.

TABLE 3

| Run Number | Feed NMP Content (wt %) | Raffinate NMP Content (wt %) | Xin/Xout | E | HTU (ft)/(m) |
|---|---|---|---|---|---|
| 1 | 6.62 | 0.81 | 8.2 | 2.9 | 3.9/1.19 |
| 2 | 6.62 | 1.136 | 5.8 | 2.7 | 4.7/1.43 |
| 3 | 6.62 | 0.818 | 8.1 | 2.5 | 3.8/1.16 |
| 4 | 6.38 | 0.726 | 8.8 | 4.7 | 4.2/1.28 |
| 5 | 6.38 | 0.505 | 12.6 | 4.6 | 3.6/1.1 |
| 6 | 1.19 | 0.372 | 3.2 | 2.9 | 7.7/2.35 |
| 7 | 1.19 | 0.258 | 4.6 | 2.8 | 5.6/1.71 |
| 8 | 1.19 | 0.121 | 9.8 | 2.5 | 3.4/1.04 |

While operating the pilot scale unit under these conditions, flooding occurs near the top of the long tubular segment, but nowhere else in the long tubular segment. A probable cause of flooding in that portion of the long tubular segment is degassing of the feed fluid composition such that part or all of the dissolved CO and $H_2$ gases come out of solution.

Skilled artisans recognize that a preferential flooding in the top section of the long tubular segment prevents the unit from operating with high holdup of the dispersed-phase fluid and high drop population in the bottom section. This suggests that the throughput and mass-transfer performance (HTU) data given in Table 3 do not reflect the full performance potential of the pilot scale unit.

Ex 1

Graduated Plate Spacing

Replicate Comp Ex A, but change plate-plate spacing beginning at that portion of the plate stack proximate to the top of the long tubular section and proceeding along the plate stack to that portion proximate to the bottom of the long tubular section as follows: two feet (0.61 m) of four inch (10.2 cm) spacing for that portion of the plate stack proximate to the top of the long tubular section, followed by two feet (0.61 m) of three inch (7.6 cm) spacing, with two inch (5.1 cm) spacing for remaining portions of the plate stack. Table 4 below summarizes pilot scale unit operating conditions and Table 5 below summarizes mass-transfer performance according to those unit operating conditions.

TABLE 4

| Run Number | Aldehyde Feed Rate (gal/hr)/(m³/hr) | Water Feed Rate (gal/hr)/(m³/hr) | Throughput (gph/ft²)/(metric) | S/F Ratio (wt/wt) | Bottom Temp (° C.) | Top Temp (° C.) | Agitation Intensity (SPM*-inch)/(SPM-cm) |
|---|---|---|---|---|---|---|---|
| 9 | 22/0.083 | 3.2/0.012 | 1153/ | 0.16 | 74 | 73 | 60/152 |
| 10 | 14.4/0.054 | 1.9/0.007 | 744/ | 0.143 | 69 | 71 | 75/190 |
| 11 | 8/0.030 | 1/0.004 | 411/ | 0.134 | 76 | 63 | 120/305 |
| 12 | 4.1/0.016 | 0.8/0.003 | 222/ | 0.205 | 76 | 59 | 135/343 |
| 13 | 4.4/0.017 | 1.1/0.004 | 251/ | 0.271 | 70 | 60 | 135/343 |
| 14 | 3.8/0.014 | 0.8/0.003 | 211/ | 0.224 | 90 | 57 | 137348 |
| 15 | 3.9/0.015 | 0.004 | 223/ | 0.271 | 31 | 35 | 98/249 |
| 16 | 7.3/0.028 | 1.2/0.005 | 391/ | 0.185 | 91 | 85 | 136/345 |

*SPM-inch denotes the number of complete up and down strokes per minute multiplied by the stroke length in inches.

TABLE 5

| Run Number | Feed NMP Content (wt %) | Raffinate NMP Content (wt %) | Xin/Xout | E | HTU (ft)/(m) |
|---|---|---|---|---|---|
| 9 | 6.31 | 0.875 | 7.2 | 2.4 | 4.0/1.22 |
| 10 | 6.31 | 0.888 | 7.1 | 2.1 | 3.8/1.16 |
| 11 | 6.31 | 0.689 | 9.2 | 2.0 | 3.2/0.98 |
| 12 | 6.4 | 0.098 | 66 | 3.0 | 1.9/0.58 |
| 13 | 6.4 | 0.076 | 84 | 4.0 | 1.9/0.58 |
| 14 | 0.611 | 0.0159 | 38 | 3.3 | 2.2/0.67 |
| 15 | 6.37 | 0.0897 | 71 | 4.0 | 2.0/0.61 |
| 16 | 6.37 | 0.31 | 20 | 2.7 | 2.6/0.79 |

The graduated plate spacing significantly reduces or effectively eliminates premature flooding near the top of the long tubular section, so throughput or agitation intensity can be increased to higher levels before the pilot scale unit floods more uniformly along the length of the long tubular section. As a result, the graduated plate spacing improves mass transfer performance relative to uniform plate spacing. For example, compare Run Number 2 (throughput of 778 gph/ft² (31.7 m³/h/m²) and HTU of 4.7 feet/1.43 m with Run Number 10 (throughput of 744 gph/ft² (30.3 m³/h/m²) and HTU of 3.8 feet/1.16 m. Compare also Run Number 1 (throughput of 440 gph/ft² (17.9 m³/h/m²) and HTU of 3.9 feet/1.19 m with Run Number 11 (throughput of 411 gph/ft² (16.7 m³/h/m²) and HTU of 3.2 feet/0.98 m. At high throughput rates as in Runs 3 and 9 (respective throughput rates of 1028 gph/ft² (41.9 m³/h/m²) and 1153 gph/ft² (47.0 m³/h/m²), graduated plate spacing appears to be nearly equivalent with uniform plate spacing with differences possibly within experimental error deviations. Conversely at low throughputs like those of Runs 12-15, HTU values as low as 1.9 ft/0.58 m to 2.2 ft/0.67 m for graduated plate spacing are achieved whereas the HTU value for the lowest throughput in Table 2 (390 gph/ft²) (15.9 m³/h/m²) is much larger at 3.4 ft/1.04 m.

What is claimed is:

1. A method of effecting liquid-liquid separation using at least two counter-flowing liquids each of which flows through a vertically aligned treatment zone, the treatment zone having a longitudinal axis and a bottom end that is spaced apart from and disposed below a top end, which method comprises:

a. establishing a flow of a feed fluid composition in a first direction through the treatment zone, the first direction being from the bottom end to the top end, the feed fluid composition (1) comprising a first liquid and a removable solute, (2) being at least partially saturated with a dispersible gas, and (3) having a first density, the feed fluid composition being present under a pressure sufficient to maintain at least a portion of the dispersible gas in solution as the feed fluid composition enters the treatment zone, yet insufficient to maintain the dispersible gas in solution as the feed fluid composition traverses the treatment zone from the bottom end to the top end, such that at least a portion of the dispersible gas comes out of solution as the feed fluid composition traverses the treatment zone, moving from the bottom end to the top end, and having a first mass flow rate;

b. establishing a flow of a wash fluid composition in a second direction through the treatment zone, the second direction being from the top end to the bottom end, the wash fluid composition comprising a second liquid, the second liquid (1) being either immiscible or, at most, partially miscible with the first liquid such that their intimate contact does not yield a single liquid phase, and (2) having a density that is greater than the first density;

c. effecting operative contact between the flows of feed fluid composition and wash fluid composition while imparting sufficient mechanical energy to the flows to effect distribution of one fluid composition as a dispersed phase suspended within a continuous phase comprising the other fluid composition, the mechanical energy having a greater intensity at the bottom end of the treatment zone than at the top end of the treatment zone, the operative contact being sufficient to effect transfer of at least a portion of the removable solute from the feed fluid composition to the wash fluid composition, thereby converting the feed fluid composition to a raffinate liquid and the wash fluid composition to an extract liquid; and d. removing the raffinate liquid from the top end of the treatment zone and the extract liquid from the bottom end of the treatment zone.

2. The method of claim 1, wherein intensity of the mechanical energy throughout the treatment zone is sufficient to minimize flooding within any portion of the treatment zone, yet insufficient to sustain foaming proximate to the top end of the treatment zone.

3. The method of claim 1, wherein a plurality of rotating impellers impart mechanical energy to the flows, the rotating impellers being disposed within the treatment zone and spaced apart one from another along the longitudinal axis with impeller to impeller spacing being greater proximate to the top of the treatment zone than at the bottom of the treatment zone.

4. The method of claim 1, wherein a plurality of rotating impellers impart mechanical energy to the flows, the rotating impellers being spaced apart from one another along the longitudinal axis and varying in at least one of diameter, shape or proximity to internal baffles or discs in order to alter the intensity of mechanical energy along the treatment zone, from a lower value at the top of the treatment zone to a higher value at the bottom of the treatment zone.

5. The method of claim 1, wherein the removable solute comprises a liquid contaminant.

6. The method of claim 1, wherein the removable solute comprises a liquid product.

7. The method of claim 1, wherein the second liquid has a second mass flow rate that, in conjunction with the first mass flow rate, yields an extraction factor greater than unity.

8. A method of using a reciprocating plate extraction column to effect liquid-liquid separation between counter-flowing fluid compositions, the fluid compositions being a feed fluid composition and a wash fluid composition, the feed fluid composition containing a removable solute, having a lower density than the wash fluid composition, and being at least partially saturated with a dispersible gas, the column having disposed therein a treatment zone, the treatment zone having a bottom end and a top end, the bottom end being spaced apart from, disposed below and in fluid communication with the top end, the treatment zone having a longitudinal axis passing through both the top end and the bottom end, the treatment zone also having disposed therein a plurality of perforated plates mounted on a shaft that is coaxially aligned with the treatment zone longitudinal axis and operatively connected to a reciprocating drive mechanism located external to the treatment zone, each of the plates having a major surface that is substantially perpendicular to the longitudinal axis, the plates being spaced apart one from another along the longitudinal axis with plate to plate spacing being greater proximate to the top of the treatment zone than at the bottom of the treatment zone, the bottom of the treatment zone being in fluid communication with a source of the feed fluid composition and with an extract liquid collection means and the top of the treatment zone being in fluid communication with a source of the wash fluid composition and with a raffinate liquid collection means, the method comprising:

a. directing a flow of feed fluid composition from the source of feed fluid composition through the treatment zone so it passes from the bottom end to the top end and a counter-current flow of wash fluid composition from the source of wash fluid composition through the treatment zone so it passes from the top end to the bottom end, such that at least a portion of the dispersible gas comes out of solution as the feed fluid composition traverses the treatment zone, moving from the bottom end to the top end;

b. effecting operative contact between the flows of feed fluid composition and wash fluid composition while imparting sufficient mechanical energy to the flows via the perforated plates to effect distribution of one fluid composition as a dispersed phase within a continuous phase comprising the other fluid composition, the operative contact being sufficient to effect transfer of at least a portion of the removable solute from the feed fluid composition to the wash fluid composition, thereby converting the feed fluid composition to a raffinate liquid and the wash fluid composition to an extract liquid; and c. conveying the raffinate liquid to the raffinate collection means and the extract liquid to the extract liquid collection means.

* * * * *